United States Patent [19]

Iyer et al.

[11] Patent Number: 4,740,535
[45] Date of Patent: Apr. 26, 1988

[54] PHENOLIC RESIN BINDERS FOR FOUNDRY AND REFRACTORY USES

[75] Inventors: Raja Iyer, Hazelcrest; Rasik C. Shah, Des Plaines, both of Ill.

[73] Assignee: Acme Resin Corporation, Westchester, Ill.

[21] Appl. No.: 22,933

[22] Filed: Mar. 6, 1987

Related U.S. Application Data

[62] Division of Ser. No. 760,846, Jul. 31, 1985, Pat. No. 4,668,759.

[51] Int. Cl.$^4$ .............................................. B22C 11/22
[52] U.S. Cl. ...................................... 523/145; 523/146; 524/594
[58] Field of Search ................... 523/145, 146; 524/594

[56] References Cited

U.S. PATENT DOCUMENTS

| | | | |
|---|---|---|---|
| 2,079,633 | 5/1937 | Rothrock | 260/4 |
| 3,485,797 | 12/1969 | Robins | 260/57 |
| 4,283,319 | 8/1981 | Konil | 523/145 |
| 4,336,179 | 6/1982 | Iyer | 523/145 |
| 4,427,800 | 1/1984 | Nakamura | 523/145 |
| 4,454,239 | 6/1984 | Cassens | 501/99 |
| 4,644,022 | 2/1987 | Iyer | 523/145 |

FOREIGN PATENT DOCUMENTS

| | | | |
|---|---|---|---|
| 212077 | 5/1957 | Australia | 528/140 |
| 927041 | 5/1973 | Canada | 528/139 |
| 0013730 | 4/1972 | Japan | 523/145 |
| 046394 | 4/1978 | Japan | 528/139 |
| 6088871 | 7/1981 | Japan | 523/145 |
| 0088072 | 6/1982 | Japan | 523/145 |
| 1082946 | 4/1986 | Japan | 523/145 |
| 1108443 | 5/1986 | Japan | 523/145 |
| 565368 | 11/1944 | United Kingdom | 528/139 |
| 773510 | 4/1957 | United Kingdom | 528/139 |
| 773611 | 5/1957 | United Kingdom | . |

OTHER PUBLICATIONS

International Application published under the Patent Cooperation Treaty (PCT-WO 8505580), "Phenolic Resin-Polyisocyanate Binder Systems"; Ashland Oil, Inc., pp. 1-27.

*Primary Examiner*—Joseph L. Schofer
*Assistant Examiner*—J. M. Reddick

[57] ABSTRACT

A process for preparing modified phenolic resole resins providing improved binders for refractories and foundry cores and molds. The resins are prepared by treating a phenol with a molar excess of aldehyde in the presence of an alkaline catalyst followed by further reaction at a pH below 7 in the presence of a catalyst which promotes formation of ortho-ortho benzylic ether bridges between the phenolic nuclei.

5 Claims, No Drawings

PHENOLIC RESIN BINDERS FOR FOUNDRY AND REFRACTORY USES

This application is a division of application Ser. No. 760,846, filed July 31, 1985, now U.S. Pat. No. 4,668,759.

FIELD OF THE INVENTION

This invention relates to liquid phenolic resole resins useful as refractory binders and as binders for making foundry sand cores and molds. The binders exhibit excellent storage stability and their high coking values make them particularly useful as refractory binders.

BACKGROUND OF THE INVENTION

Foundry cores and molds used in making metal castings are normally prepared from a composition including sand or similar material and a curable or polymerizable binder coated on the sand particles. The purpose of this binder coating is to permit the mixture to be hardened after it is first shaped or molded into a desired form. Typically, after the aggregate material and binder have been mixed, the resulting mixture is rammed, blown or otherwise formed to the desired shape or pattern and then cured with the use of catalysts and/or heat to a solid, cured state.

When molten metal is poured into a sand mold it solidifies taking the shape or pattern of the mold. The temperature of the molten metal is so high that the resin binder burns out of the mold. The mold then collapses leaving free-flowing sand that can be reused to make a new mold.

Different processes for forming molds and cores have been developed in the foundry industry. One process known as the "baking" process requires that the mixture of aggregate material and binder be shaped in a pattern box and then cured by heat. Another process using a binder system which does not require heating in order to bring about curing or hardening is known as a "no-bake" process. The present invention is directed to an improved resin for use in both processes.

Phenol-formaldehyde resole resins have been used as binders in these processes for making foundry cores and molds. Although the resole resins offer a favorable raw material cost when compared with some other resins used in the processes, they have certain limitations. Resole resins normally have a limited shelf-life and must be used promptly or stored under refrigeration during warm weather. In addition, when the previously-used resole resins are mixed with sand and catalysts, the mixture has to be placed in the mold immediately or it becomes useless.

Phenolic resole resins are also used as refractory binders. A refractory is a ceramic material of low thermal conductivity characterized by the ability to withstand extremely high temperatures. Refractories are used for lining steel furnaces and other high-temperature applications. They are normally cast in the form of brick with some type of binder to assure their stability.

However, conventional resole resins have certain drawbacks when used as refractory binders. This is particularly true when the refractory is prepared from basic material such as magnesia. When magnesia granules are mixed with the resole resins, the mixtures tend to harden in a comparatively short time. This reduces the time that the mix can be retained before it must be shaped into bricks or other desired shapes. Furthermore, the articles produced from these mixtures often show poor strength and durability.

A modified phenolic resole resin has been discovered which does not have the shortcomings of conventional resole resins. This resin can be stored at room temperature for long periods of time without undergoing deterioration. It is useful as a sand binder in both the "baking" and "no-bake" processes for making foundry cores and molds. In addition, it is a good binder for refractories, and refractory mixes of magnesia particles with this resin show excellent storage stability.

SUMMARY OF THE INVENTION

In accordance with this invention, there is provided a process for preparing a modified phenolic resole resin comprising the steps (a) reacting a phenol with a molar excess of an aldehyde in the presence of an alkaline catalyst until from about 10% to about 90% by weight of the aldehyde has combined with the phenol;

(b) acidifying the reaction mixture of Step (a) to a pH below 7; and (c) heating the acidified mixture of Step (b) with a catalyst which promotes formation of ortho-ortho benzylic ether bridges between the phenolic nuclei until the free aldehyde in the mixture is less than about 2% by weight of the mixture.

Further, in accordance with this invention, there is provided a modified phenolic resole resin obtained by a process comprising the steps of (a) reacting a phenol with a molar excess of an aldehyde in the presence of an alkaline catalyst until from about 10% to about 90% by weight of the aldehyde has combined with the phenol;

(b) acidifying the reaction mixture of Step (a) to a pH below 7; and (c) heating the acidified mixture of Step (b) with a catalyst which promotes formation of ortho-ortho benzylic ether bridges between the phenolic nuclei until the free aldehyde in the mixture is less than about 2% by weight of the mixture.

DETAILED DESCRIPTION OF THE INVENTION

In the practice of this invention, the modified phenolic resole resins are produced by a multistep process. In the first step of the process, a phenol reacts with a molar excess of an aldehyde in the presence of a basic catalyst. The phenols employed in the formation of the phenolic resin are generally any of the monohydric phenols which may be utilized to prepare phenolic resins. The only limitation is that the resin formed from the phenolic material is one that forms a homogeneous solution in the aqueous medium employed. Exemplary phenols include phenol itself and the cresols.

The aldehyde employed in the formation of the phenolic resin may also vary widely. Suitable aldehydes include any of the aldehydes heretofore employed in formation of phenolic resins, such as formaldehyde, acetaldehyde, propionaldehyde, furfuraldehyde, and benzaldehyde. In general, the aldehydes employed have the formula RCHO, where R is a hydrogen or a hydrocarbon radical of 1 to 8 carbon atoms. The most preferred aldehyde is formaldehyde.

The basic catalysts used in the formation of the phenolic resin include any of the basic catalysts heretofore employed in the formation of phenolic resins, such as alkaline or alkaline earth hydroxides, and organic amines. The amount of basic catalysts used to form the resole resin can vary widely. It is convenient to use between about 0.003 and 0.08 moles of catalyst per mole of phenol.

The preferred phenolic resins employed in the practice of this invention are made from phenol and formaldehyde at a mole ratio of formaldehyde to phenol in the range of from about 1.1:1 to about 2.5:1. The most preferred mole ratio of formaldehyde to phenol is a mole ratio in the range of from about 1.1:1 to about 1.4:1.

The first step of the process is carried out by treating the mixture of phenol and aldehyde in an aqueous solution with the basic catalyst at a temperature at or below the boiling point of water, preferably at about 60° C. to about 90° C. until the free aldehyde in the mixture is in the desired range. Suitable resins are obtained when the first step of the process is carried out until from about 10% to about 90% of the aldehyde has reacted with the phenol. Reaction temperatures are controlled by conventional means, such as heating, cooling, or portionwise addition of catalyst.

When the reaction has proceeded to the desired stage, as indicated by the amount of free aldehyde remaining in the reaction mixture, the reaction mixture is acidified until its pH is below 7. Preferably, the pH of the mixture is brought to between about 5.5 and 6.5. This acidification can be accomplished by the addition of an acid, such as a mineral acid, or by the addition of a catalyst for the next step which provides an acidic pH.

The second catalyst is one which causes formation of ortho-ortho benzylic ether bridges between the phenolic nuclei in the resin. Catalysts useful for this purpose include salts of the divalent ions of Mn, Zn, Cd, Mg, Co, Ni, Fe, Pb, Ca, and Ba. A preferred catalyst is zinc acetate. These catalysts give phenolic resins wherein the bridges joining the phenolic nuclei in the resin are predominantly ortho-ortho benzylic ether bridges of the general formula $-CH_2(OCH_2)_n-$ where n is a small positive integer.

The reaction mixture containing the second catalyst is again heated to a temperature at or below the boiling point of water, preferably at about 80° C. to about 95° C. Heating is continued until the free aldehyde in the solution is less than about 2%.

When the reaction reaches the desired degree of completion, the water content of the resin is adjusted to the desired value and the viscosity of the mixture is further adjusted if desired by the addition of a solvent. It is convenient to adjust the water content of the resin by evaporation under reduced pressure. The evaporation accomplishes both the cooling of the mixture and the lowering of its water content. The preferred water content of the final product will depend on the use of the resin binder. As is generally known to those skilled in the art, binders used to make refractory articles preferably contain very little water. On the other hand, binders used for making foundry cores and molds may contain from 10% to 20% or even greater amounts of water.

The resin binders of the present invention are useful for making foundry cores and molds by the "no-bake" process. This involves mixing sand or other refractory material with an acidic catalyst and the resin binders as herein described. The resin is usually employed as a solution for ease of coating on the sand.

Polar solvents are useful for preparing solutions of the resin. Such solvents include alcohols, ketones, and esters in which the resin is soluble. Exemplary compounds are methanol, ethanol, n-proponal, isopropanol, butanol, ethylene glycol, glycerine, furfuryl alcohol, acetone, butanone, cyclohexanone, and isophorone. The solution can also contain small amounts of water, but for optimum stability of the resin, it is preferable that the water content be less than about 15% by weight of the solution. The viscosity of the solution is controlled by adjusting the amount of water and solvent present. A solution having a viscosity below about 1000 centipoises (cps) at 25° C., preferably from 50 to 250 cps, is suitable for mixing with sand.

It is often the practice in the foundry art to include a variety of additives in the resins used to prepare foundry cores and molds. These additives include such materials as silanes, sources of fluoride ion, deodorizing agents, and the like. When the resins are used in "no-bake" applications, it is often convenient to add urea which combines with the free formaldehyde present. Such additives may be used with the resins of the present process and do not interfere with the improved properties of these resins.

When the resin binder of this invention is used in the "no-bake" process, it is cured by means of an acidic catalyst. Any acidic catalyst ordinarily used for curing phenolic resins may be utilized. Acids that are generally useful are strong organic acids, strong mineral acids, and combinations of these. Exemplary are such acids as benzenesulfonic acid, xylenesulfonic acid, p-toluenesulfonic acid, methanesulfonic acid, sulfuric acid, and mixtures thereof.

Any of the solid materials commonly used to make foundry cores and molds can be mixed with the resin compositions of this invention. These include silica sands, lake sands, bank sands, zircon sand, chromite sand, olivine sand, and the like. Also mixtures of these may be used.

When the modified phenolic resins of this invention are used as binders for refractories, they are mixed with a refractory material in the presence of a polar solvent to give a refractory mix. The modified resin comprises from about 1% to about 25% by weight of the mix. This refractory mix is then used to make refractory articles of various shapes or forms. The mix in the desired form is heated to a temperature sufficiently high to cure the resin and produce a hardened refractory article.

The modified phenolic resins of this invention are particularly effective for refractory binder mixes with basic refractory material, such as magnesia. However, they are also suitable for formulating refractory binder mixes with acidic materials, such as silica, and with neutral refractory materials, such as alumina. Other refractory materials, such as olivine, dolomite, chromite, zircon, and silicon carbide, can be used with the binders of this invention.

The binders of this invention, as noted above, have very desirable storage stability. In addition, they have high coking values. Coking values are obtained by pyrolyzing the material for a specific time at a specified high temperature in standardized equipment that limits the available oxygen supply. The percentage of residue is reported as the coking value. High coking values of the binders of this invention make them particularly desirable as refractory binders.

The following examples illustrate the invention. It is to be understood that the examples are illustrative only and do not intend to limit the invention in any way. In the examples, all parts and percentages are by weight, the temperatures are degrees centigrade, and the viscosity values are centipoises unless otherwise indicated.

EXAMPLE 1

A solution of 2004 g of phenol, 1386 g of a 50% aqueous formaldehyde solution, and 7 g of calcium hydroxide was prepared and found to have a pH of 7.7. The mixture was heated slowly to 80° C. and maintained at this temperature for 1 hour. The free formaldehyde content as determined by the standard hydroxylamine hydrochloride method was 4.8%. The mixture was cooled to 50° C. and acidified with a solution of 8.5 g of concentrated hydrochloric acid in 17 g of water to give a solution with a pH of 6.5. Addition of 100 g of a 25% aqueous zinc acetate solution reduced the pH of the mixture to 5.5. This mixture was heated at 95° C. for 2¼ hours at which time the free formaldehyde was reduced to 1.15%. The mixture was cooled to 50° C. and evaporated under reduced pressure until the water content was about 12.2%. The mixture was diluted with 185 g of methyl alcohol and 9.9 g of gamma-aminopropyltriethoxysilane was added. The viscosity of the resin was 95 cps at 25° C. and it contained 0.89% free formaldehyde.

Comparative Test Resin 1

A conventional phenolic resole resin was prepared by heating a mixture of 1120 parts of phenol, 935 parts of 50% aqueous formaldehyde solution, and 17 parts of calcium hydroxide at 70° C. until a free formaldehyde content of the mixture was about 1.5%. The mixture was neutralized with hydrochloric acid before it was concentrated under reduced pressure to a water content of about 15%. To the cooled solution was added sufficient methyl alcohol to give a 5% concentration and sufficient gamma-aminopropyltriethoxysilane to give a 0.25% concentration. The viscosity of the resin was 80 cps, and it contained 0.5% free formaldehyde.

EXAMPLE 2

The general procedure of Example 1 was followed except that the initial reaction mixture was heated until the free formaldehyde level had reached 2.9% indicating that 86% of the formaldehyde originally present had reacted with the phenol. The final product after treatment with zinc acetate catalyst dehydration and dilution with methanol to a methanol concentration of 6% had a free formaldehyde content of 0.75%, a viscosity of 186 cps at 25° C., and contained 10.1% water.

EXAMPLE 3

The general procedure of Example 1 was followed except that the initial reaction was carried out for 30 minutes at 80° C. until the free formaldehyde content of the mixture was 8.64% indicating that 58% of the formaldehyde originally present had reacted with the phenol. The final product after treatment with zinc acetate catalyst dehydration and dilution with methanol had a viscosity of 106 cps at 25° C., a free formaldehyde content of 1.0%, and a water content of 11.3%.

EXAMPLE 4

The general procedure of Example 1 was followed except that the first reaction was stopped when the free formaldehyde content reached 17.8% indicating that only 13% of the formaldehyde originally present had reacted with the phenol. Zinc acetate catalyst was then added and the mixture was heated at 95° C. until the free formaldehyde level reached 1.1%. After the mixture was dehydrated under reduced pressure and diluted with methanol to a methanol concentration of 5.3%, the final product had a viscosity of 88 cps at 25° C., a water content of 12.2%, and a free formaldehyde content of 0.6%.

EXAMPLE 5

The general procedure of Example 1 was followed except that the calcium hydroxide catalyst in the first step was replaced with 7 g of potassium hydroxide. After 4 hours at 80° C., the free formaldehyde content dropped to 5.85%. The final product after reaction with zinc acetate, evaporation of water, and dilution with methanol to a methanol concentration of 6% had a viscosity of 292 cps at 25° C., a water content of 11%, and a free formaldehyde content of 0.69%.

EXAMPLE 6

The reaction of Example 1 was repeated except that the initial amount of phenol was only 1811 g, and 6 g of calcium hydroxide catalyst was employed. The free formaldehyde content after the first reaction step was 2.8%. The final product after reaction with zinc acetate, dehydration, and dilution with methanol to a methanol concentration of 6.4% had a viscosity of 282 cps at 25° C., a free formaldehyde content of 0.69%, and a water content of 11%.

Viscosity Stabilities of the Resins

The viscosity of resins of Examples 1 through 6 were measured after the resins were held at 40° C. for various lengths of time in closed containers. The results given in Table I show that the resins of this invention exhibit much greater storage stability than does a conventional resole resin prepared using an alkaline catalyst in a one-step reaction (Comparative Test Resin 1).

TABLE I

| Resin of Example No. | Viscosity of Resins (cps at 25° C.) | | | |
|---|---|---|---|---|
| | Initial | After 1 Week at 40° C. | After 2 Weeks at 40° C. | After 3 Weeks at 40° C. |
| Comparative Test Resin 1 (Conventional Resole) | 93 | 256 | 664 | 2200 |
| 1 | 83 | 118 | 160 | 240 |
| 2 | 186 | 246 | 320 | 460 |
| 3 | 106 | 164 | 226 | 334 |
| 4 | 88 | 128 | 200 | 250 |
| 5 | 172 | 220 | 270 | 400 |
| 6 | 292 | 400 | 660 | 1360 |

Tests on Resin-Coated Sands

The following sand tests were performed using the resin compositions of Examples 1-6 and Comparative Test Resin 1. To a K-45 KitchenAid mixer was added 2500 g of Wedron 730 washed and dried silica sand. The sand was brought to a temperature of 27° C., 8 g of a benzene sulfonic acid based catalyst, comprising an 80% solution of benzene sulfonic acid plus about 1% sulfuric acid in methanol, was added, and the combination was mixed for 1 minute. Then 25 g of resin was added before mixing was continued for another minute. Freshly prepared resins, as well as those which had been aged at 40° C. for various periods of time, were used.

Part of the sand mixture was used to form standard American Foundrymen's Society 1-inch dog-bone tensile briquets, in a Dietert No. 696, 12-cavity tensile core box. The cores were cured at room temperature for 24 hours before they were tested. Tensile strengths of the cores were measured in pounds per square inch (psi) using a Detroit Testing Machine Company, Model CST, tensile tester. Average tensile data are given in Table II. The rest of the sand was used to make a truncated pyramid core 12 inches high, 4 inches square at the base, and 2 inches square at the top, using a Dietert 623-50 core box. Sand was poured into the core box, jolted four times using a Dietert 623 core box jolter. A thermometer was inserted about 6 inches into the core. The strip time was determined as the time at which the core was cured so hard that the thermometer could no longer be pushed by hand deeper into the core. Test results are given in Table II.

TABLE II

| Mix Containing Resin of Example No. | 24-Hour Tensile Strength in psi Briquets Formed After Resin Held for | | | |
|---|---|---|---|---|
| | 0 Weeks | 1 Week | 2 Weeks | 3 Weeks |
| Comparative Resin Test 1 (Conventional Resole) | 321 (25)[a] | 247 (16) | 109 (13) | [b] |
| 1 | 343 (22) | 298 (22) | 319 (22) | N.D.[c] |
| 2 | 272 (20) | 240 (18) | 256 (24) | 208 (28) |
| 3 | 332 (25) | 260 (19) | 347 (23) | 325 (26) |
| 4 | 310 (27) | 336 (28) | 280 (31) | N.D. |
| 5 | 237 (14) | 327 (16) | 252 (17) | N.D. |
| 6 | 301 (13) | 346 (16) | 305 (15) | N.D. |

[a]Values in parenthesis are strip time in minutes.
[b]Resin could not be mixed with sand.
[c]N.D. = Not Determined.

Comparative Test Resin 2

A resin was prepared using only zinc acetate catalyst, omitting the prior use of an alkaline catalyst as in the examples of the invention. To a solution of 1336 g of phenol and 924 g of 50% formaldehyde was added 134 g of a 25% aqueous solution of zinc acetate. The pH of the resulting solution was 5.2. The mixture was heated at 95° C. with stirring under reflux for 90 minutes, which reduced the free formaldehyde content to 5.0%. The mixture was then dehydrated under reduced pressure until the water content was reduced to 18.5%. The mixture was again stirred under reflux at 95° C. for an additional 90 minutes at which time the free formaldehyde content was found to be 2.2%. The mixture was further dehydrated under vacuum until the water content was reduced to 11.7%. The mixture was then heated at 95° C. for an additional 45 minutes, 20 g of urea was added, and the batch was held at 95° C. for another 15 minutes. The mixture was then cooled and sufficient gamma-aminopropyltriethoxysilane was added to give a 0.25% concentration. The viscosity of the resin was 170 cps at 25° C. and contained 0.66% free formaldehyde. When tests were run on sands coated with this resin according to the procedure given for the sands of Examples 1-6, the resin was too slow curing to be of value. The strip time of the core was 37 minutes, and the average tensile strength of the briquets, which had been used for 24 hours, was only 147 psi.

EXAMPLE 7

This example demonstrates the utility of the resin of this invention as a foundry core binder in a "baking" process. A mixture of 5000 g of Wedron 730 sand and 75 g of commercial corn starch was mulled in a Simpson Mix-Muller (18-inch model) for 30 seconds. Then 125 g of water was added and mixing was continued for 1 minute. Finally, 50 g of the resin of Example 2 was added and the mixture was mulled for an additional 3 minutes. Then 13 g of kerosene as a release agent was added to the mix and mulling was carried out for an additional 1 minute.

Baked tensile strength specimens were prepared from the coated sand by placing the sand in a tensile specimen mold and ramming it four times with a Dietert Detroit No. 315 sand rammer. Specimens were baked in an oven at 177° C. for different times before the briquets were removed and cooled for 1 hour in a desiccator. Tensile strengths were measured using a Detroit Testing Machine, Model CST, tensile tester. Each value reported is the average of the strengths measured using three specimens. The results given in Table III show that the resins of this invention cure sufficiently rapidly to make them useful in foundry core baking applications.

TABLE III

| Cure Time (minutes at 177° C.) | Briquet Weight (grams) | Average Tensile Strengths (psi) |
|---|---|---|
| 30 | 103 | 258 |
| 60 | 105 | 225 |
| 90 | 105 | 225 |
| 120 | 105 | 220 |

EXAMPLE 8

This example demonstrates the utility of the present resins as refractory binders. A solution of 1830 g of phenol, 1266 g of a 50% aqueous solution of formaldehyde, 168 g of water, and 40 g of 25% solution of sodium hydroxide was mixed and found to have a pH of 8.4. The mixture was stirred under reflux at 80° C. for 105 minutes. At this time, the free formaldehyde content, as determined by the hydroxylamine hydrochloride method, was 3.2%. The pH of the mixture was reduced to 6.9 by the addition of dilute hydrochloric acid. The addition of 91 g of 25% zinc acetate solution lowered the pH to a value of 5.9. The resulting mixture was stirred under reflux at 95° C. for an additional 90 minutes. This reduced the free formaldehyde content to 0.51%. The mixture was cooled somewhat and dehydrated under vacuum at an initial temperature of 55° C., which was slowly raised to 80° C. The residual resin weighed 2365 g.

To 1200 g of the resin was added 300 g of isopropanol to give a product having a refractive index at 25° C. of 1.5436, a viscosity of 500 cps at 25° C., a free formaldehyde content of 0.6%, and a water content of 1.54%. A solution of 191.5 g of the resin and 63.8 g of isopropanol was added with mixing to 2.27 kg of refractory grade magnesium oxide granules (known as magnesite or magnesia) containing a maximum of 3.5% of calcium oxide and having a size distribution based on U.S. Standard Sieve of 1% +20, 15-25% −20 to +60, 20-45% −60 to +100, and 25-35% −325. A portion of the mix was removed and used immediately to prepare tensile briquets. A second portion of the mix was held for 24 hours before it was used to prepare the test specimens. The test specimens were American Foundrymen's Society 1-inch dog-bone tensile briquets prepared using a Dietert sand rammer with ramming plate attachment and a two-part metal core box. Briquets were heated in an oven at 166° C. for 2 hours before they were allowed to cool to room temperature and tested on a Detroit Testing Machine, Model CST, tensile tester. Average tensile strength of specimens formed immediately after mixing was 950 psi. Average tensile strength of specimens formed from a mix which had been held for 24 hours was 690 psi.

The coking value of the modified phenolic resin was determined by pyrolyzing the material using the American Standard Testing Method No. D 2416-73. The coking value of 61.6% was superior to the values of 47% to 53% obtained for previously-reported phenolic resins.

Thus, it is apparent that there has been provided, in accordance with this invention, a resin useful as a binder for refractories and for foundry cores and molds that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A granular material useful for the prepartion of foundry cores and molds comprising an intimate mixture of sand and a resin binder wherein the resin binder is a modified phenolic resole resin obtained by a process comprising the steps of:
   (a) reacting a phenol with a molar excess of an aldehyde in the presence of an alkaline catalyst until from about 10% to about 90% by weight of the aldehyde has combined with the phenol;
   (b) acidifying the reaction mixture of Step (a) to a pH below 7; and
   (c) heating the acidified mixture of Step (b) with a catalyst which promotes formation of ortho-ortho benzylic ether bridges between the phenolic nuclei until the free aldehyde in the mixture is less than about 2% by weight of the mixture.

2. A free-flowing granular material useful for the preparation of foundry cores and molds by the "nobake" process comprising an intimate mixture of sand, an acidic catalyst, and a resin binder wherein the resin binder is a modified phenolic resole resin obtained by a process comprising the steps of:
   (a) reacting a phenol with a molar excess of an aldehyde in the presence of an alkaline catalyst until from about 10% to about 90% by weight of the aldehyde has combined with the phenol;
   (b) acidifying the reaction mixture of Step (a) to a pH below 7; and
   (c) heating the acidified mixture of Step (b) with a catalyst which promotes formation of ortho-ortho benzylic ether bridges between the phenolic nuclei until the free aldehyde in the mixture is less than about 2% by weight of the mixture.

3. A free-flowing granular material of claim 2 wherein the phenol used to prepare the resole resin is unsubstituted phenol and the aldehyde is an aqueous solution of formaldehyde.

4. A refractory mix comprising a refractory particles, a polar solvent and a phenolic resin binder, wherein the resin binder is a modified phenolic resole resin obtained by a process comprising the steps of:
   (a) reacting a phenol with a molar excess of an aldehyde in the presence of an alkaline catalyst until from about 10% to about 90% by weight of the aldehyde has combined with the phenol;
   (b) acidifying the reaction mixture of Step (a) to a pH below 7; and
   (c) heating the acidified mixture of Step (b) with a catalyst which promotes formation of ortho-ortho benzyllic ether bridges between the phenolic nuclei until the free aldehyde in the mixture is less than about 2% by weight of the mixture.

5. A refractory mix of claim 4 wherein the phenol used to prepare the resole resin is unsubstituted phenol and the aldehyde is an aqueous solution of formaldehyde.

* * * * *